Dec. 12, 1950     J. G. SISSON     2,533,522
SHOCK ABSORBING ANVIL ATTACHMENT FOR DIAL INDICATORS
Filed Sept. 28, 1944
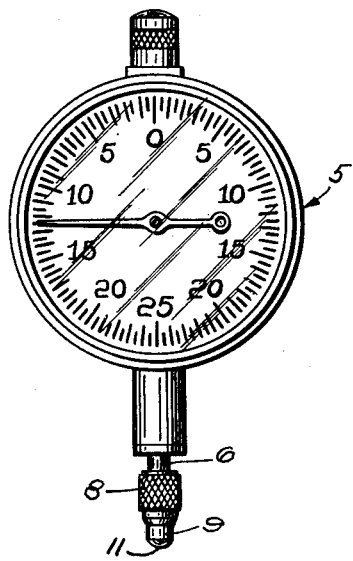
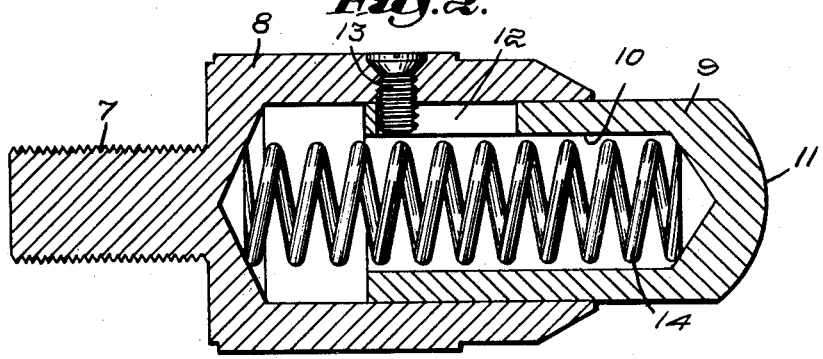
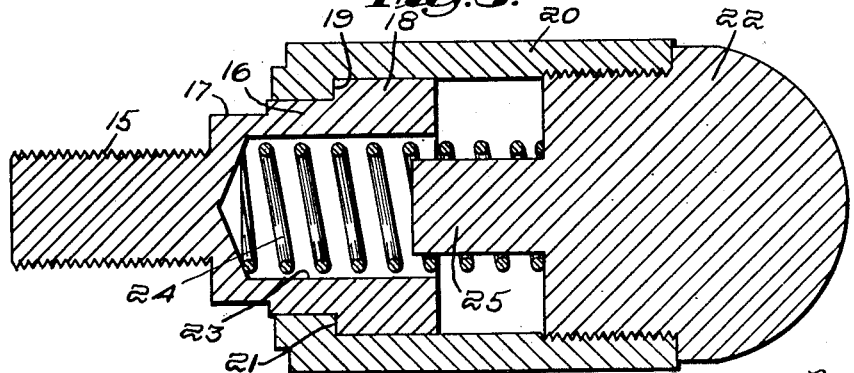
Inventor:
James G. Sisson,
by Spear, Rawlings & Spear Attorneys Patented Dec. 12, 1950

2,533,522

UNITED STATES PATENT OFFICE 2,533,522

SHOCK ABSORBING ANVIL ATTACHMENT FOR DIAL INDICATORS

James G. Sisson, Athol, Mass., assignor to The L. S. Starrett Company, Athol, Mass., a corporation of Massachusetts Application September 28, 1944, Serial No. 556,272

3 Claims. (Cl. 33—172)

My present invention relates to shock absorbing anvil attachments for dial indicators.

In various indicators, shock absorbing means have been built into the indicator to protect the mechanism against injury from shocks such as those resulting when, for example, the gear mechanism of an indicator suddenly sticks from one cause or another. Indicators incorporating such shocks absorbing means were relatively expensive to manufacture and were difficult to repair if such service was needed.

In accordance with my invention, I provide shock absorbing anvils each comprising a pair of elements, one of which is attachable to the actuating spindle of a dial indicator and the other of which has, at its end, a contact point. The members are telescopically connected to permit limited relative movement therebetween to establish extended and retracted positions of the anvil. A spring, housed by at least one of the members, and in contact with both of them, urges the anvil into its extended or normal position and yields under shocks to protect the mechanism of the dial indicator.

The shanks of my anvil preferably have a threaded connection with the end of the actuating spindles of the dial indicators. As the spindles of many indicators of different makes have a standard thread to permit their use with standard contact points, such indicators may be provided with shock absorbing anvils in accordance with my invention, thereby to ensure their mechanism against damage by shocks.

In the accompanying drawing, I have shown illustrative embodiments of my invention from which the several novel features and advantages of my invention will be readily apparent.

In the drawings:

Fig. 1 shows in front view a representative dial indicator to the actuating spindle of which is attached a shock absorbing anvil in accordance with my invention.

Fig. 2 is a longitudinal section of the anvil shown in Fig. 1, and

Fig. 3 shows in a similar view another embodiment of my invention.

At 5 in Fig. 1 I have shown a typical dial indicator to the actuating spindle 6 of which is attached a shock absorbing anvil in accordance with my invention.

The shock absorbing anvil of Figs. 1 and 2 consists of a shank 7 threaded to permit it to be screwed into the tapped end of the spindle 6. The shank 7 is formed with a barrel 8 in which is slidably mounted the work contacting member 9 cylindrically chambered as at 10 and having a work contacting end or point 11.

The barrel 8 and the member 9 are interconnected to permit limited relative movement between the member 9 and the barrel 8 to establish extended and retracted anvil positions. Such a connection may be effected by forming the member 9 with a slot 12 in parallel with the axis of the anvil and by threading a screw 13 through the barrel 8 so that it enters the slot 12. This construction has the further advantage of providing a convenient basis of assembling or disassembling the anvil.

At 14 I have shown a coiled spring seated in the chamber 10 and in the barrel 8 axially of the anvil to urge the anvil into its extended position, but yieldable in the event of shocks to protect the mechanism of the dial indicator 5 against damage.

In Fig. 3 I have shown another embodiment of my invention, the shank generally indicated at 15 of which is threaded to permit its attachment to the spindle 6 of the dial indicator 5.

I form the shank 15 with a hub portion 16, which may be oppositely flattened as at 17 to be engaged by the jaws of a spanner, and with an enlarged cylindrical support 18 which defines with the hub 16 a shoulder 19.

At 20, I have shown a shell slidable on the support 18 and having at its inner end an annular flange 21 supported by the hub 16 and engageable with the shoulder 19 to limit its outward movement relative to the shank 15. At its outer end the shell 20 is threaded to receive the contact point 22.

The shank 15 is axially chambered as at 23 to receive and axially restrain one end of the coiled spring 24 which is supported at its other end by a stud 25 on the inner surface of the contact point 22. The spring 24 urges the shell 20 and the contact point 22 into the extended anvil position in which the flange 21 is in engagement with the shoulder 19 but yields to protect the mechanism of the dial indicator 5 against shocks.

The anvil of Fig. 3 may be readily assembled and disassembled as it is only necessary to screw the contact point 22 to the shell 20 or to unscrew it therefrom.

It will be understood that the springs 14 and 24 are of such strength that they do not yield except in the case of such shocks as occur, for example, when the gear mechanism of the dial indicator jams. The contact points 11 and 22 may be hemispherically formed and hardened and plated to ensure long service as well as adding to the appearance of the anvils.

It will thus be appreciated that shock absorbing anvils, in accordance with my invention, are well adapted to meet all requirements for the protection of dial indicator mechanisms. My anvils are inexpensive to manufacture, easy to attach, reliable in use and may be easily removed and repaired if such service is needed. My invention is also of great benefit in that it is well adapted for use with any dial indicator and admits of such change in construction and design as are within the limits of the appended claims.

What I therefore claim and desire to secure by Letters Patent is:

1. A shock absorbing anvil for attachment to the forward end of the actuating spindle of a dial indicator or the like, comprising a body having an axially disposed shank of reduced diameter integral therewith and extending rearwardly therefrom for engaging the spindle and having extending axially into the body from its forward end an opening closed at its rear end by a bottom wall adjacent to the shank, a work contacting element slidably supported by said body for movement axially thereof forwardly and rearwardly with respect thereto, a relatively long helical spring disposed within said opening with its two ends respectively engaging said wall and the work contacting element forwardly of the opening and acting expansively thereon and therebetween constantly to urge the contacting element forwardly relative to the body, and co-engaging stop shoulders on the body and element wholly outside of said spring disposed to permit said axial movement of the contacting element and limit forward movement thereof relative to the body.

2. A shock absorbing anvil for attachment to the forward end of the actuating spindle of a dial indicator or the like, comprising a barrel having an axially disposed chamber therein open at its forward end and closed at the rear end by a bottom wall adjacent to the rear end of the barrel, an axially disposed shank of reduced diameter integral with and extending rearwardly from the rear end of the barrel for engaging the spindle, a work contacting member fitted to the chamber for sliding movement therein axially of the barrel, the member being relatively long and having a chamber therein open at its rear end and closed at its forward end by a bottom wall adjacent to the forward end of the member, a relatively long helical spring disposed within said chambers with its two ends engaging said two bottom walls respectively and acting expansively thereon and therebetween constantly to urge the contacting element forwardly relative to the barrel, and co-engaging stop shoulders on the barrel and element wholly outside of said spring disposed to permit said axial movement of the contacting element and limit forward movement thereof relative to the barrel.

3. A shock absorbing anvil for attachment to the forward end of the actuating spindle of a dial indicator or the like, comprising a body having an axially disposed chamber therein open at its forward end and closed at the rear end by a bottom wall adjacent to the rear end of the body, an axially disposed shank of reduced diameter integral with and extending rearwardly from the rear end of the body for engaging the spindle, a tubular shell fitted to the body for sliding movement thereon axially of the body, co-engaging stop shoulders carried by the body and shell outside of said chamber for limiting forward movement of the shell on the body, a work contacting member fixed to and closing the forward end of the shell, and a relatively long helical spring disposed within said chamber with its two ends respectively engaging said bottom wall and the work contacting member forwardly of the chamber and acting expansively thereon and therebetween constantly to urge the tubular shell forwardly and hold said stop shoulders in engagement.

JAMES G. SISSON.

REFERENCES CITED

The following references are of record in the file of this patent:

UNITED STATES PATENTS

| Number | Name | Date |
|---|---|---|
| 52,497 | Perry | Feb. 6, 1866 |
| 895,115 | Sevigny | Aug. 4, 1908 |
| 1,040,715 | Mann | Oct. 8, 1912 |
| 1,803,656 | Schuler | May 5, 1931 |
| 2,165,017 | Sisson | July 4, 1939 |
| 2,181,077 | Street | Nov. 21, 1939 |
| 2,213,088 | Hahn | Aug. 27, 1940 |

FOREIGN PATENTS

| Number | Country | Date |
|---|---|---|
| 6,780 | Great Britain | May 6, 1915 |
| 708,168 | France | Apr. 27, 1931 |